United States Patent [19]

Wallace

[11] 3,773,272

[45] Nov. 20, 1973

[54] TAPE-CARTRIDGE ASSEMBLY

[75] Inventor: Robert S. Wallace, Los Angeles, Calif.

[73] Assignee: Simpac International Inc., Santa Monica, Calif.

[22] Filed: June 25, 1971

[21] Appl. No.: 156,732

Related U.S. Application Data

[63] Continuation-in-part of Ser. No. 836,204, June 12, 1969, abandoned, which is a continuation of Ser. No. 597,132, Nov. 25, 1966, abandoned.

[52] U.S. Cl. .......... 242/55.19 A

[51] Int. Cl. .......... B65h 17/48

[58] Field of Search .......... 242/55.19 A, 197, 242/198, 199, 200; 352/72, 128; 179/100.2 Z

[56] References Cited

UNITED STATES PATENTS

| | | | |
|---|---|---|---|
| 3,241,781 | 3/1966 | Knox | 242/55.19 A |
| 3,269,671 | 8/1966 | Cole, Jr. | 242/55.19 A |
| 3,489,362 | 1/1970 | Linning | 242/55.19 A |
| 3,341,143 | 9/1967 | Nieland et al. | 242/55.19 A |
| 3,161,362 | 12/1964 | Smith | 242/55.19 A |
| 3,443,767 | 5/1969 | Liddle et al. | 242/55.19 A |
| 3,563,482 | 2/1971 | Auld | 242/55.19 A |
| 2,951,654 | 9/1960 | Steelman | 242/55.19 A |
| 2,962,238 | 11/1960 | Loewe | 242/198 |
| 3,593,935 | 7/1971 | Ritz, Jr. | 242/55.19 A |
| 3,642,220 | 2/1972 | Merry | 242/55.19 A |

*Primary Examiner*—Billy S. Taylor
*Attorney*—White, Haefliger & Bachand

[57] ABSTRACT

The disclosed magnetic tape cartridge adapted for use with a playback unit incorporates automatically releasable holders to restrain the tape roll, reel and loop against inadvertent displacement when not in use. Additional improvements include substantial reduction in number of parts, the provision of a single-part reel, integral tape pressure pads, a single-part tape cannister, provision for slide-snap-lock assembly, warpage control, and special end grips and a dust cover.

19 Claims, 33 Drawing Figures

PATENTED NOV 20 1973 3,773,272

INVENTOR.
ROBERT S. WALLACE
BY White, Haefliger & Bachand
ATTORNEYS.

INVENTOR.
ROBERT S. WALLACE

BY
White, Haefliger & Bachand
ATTORNEYS.

INVENTOR.
ROBERT S. WALLACE
BY
White, Haefliger & Bachand
ATTORNEYS.

INVENTOR.
ROBERT S. WALLACE
BY
White, Haefliger & Bachand
ATTORNEYS.

ROTATED 90°

INVENTOR
ROBERT S. WALLACE
BY
White, Haefliger & Bachand
ATTORNEYS.

TAPE-CARTRIDGE ASSEMBLY

CROSS-REFERENCE TO OTHER APPLICATIONS

This application is a continuation-in-part of Ser. No. 836,204, filed June 12, 1969, now abandoned, which was a continuation of Ser. No. 597,132, filed Nov. 25, 1966, and now abandoned.

This invention relates generally to magnetic tape cartridges adapted for use with playback units. More specifically, the invention concerns the provision of a substantially improved cartridge.

Present commercial tape cartridges, while useful, are nevertheless characterized by a number of disadvantages. Among these are included:

a. Undesirably high cost of cartridge manufacture resulting from the use of a relatively large number of parts that must be assembled. This cost factor is important inasmuch as the cartridge and tape combination must compete in the home and other markets with disc recordings which of course require no cartridge;

b. Inability to satisfactorily restrain tape loop bunching and binding when the cartridge is vibrated, as for example in automobiles when not inserted in a playback unit. This factor is important due to the large automotive market for tape cartridges;

c. The liklihood of damaging the cartridge case when the case cover and receptacle are pried apart to gain access to the tape. This disadvantage arises due to present methods of interconnecting the cover and receptacle, which also lead to warpage of the cartridge case.

d. The difficulty of retrieving a selected cartridge from a stack;

e. Problems of loading tape into a cartridge, of servicing the tape therein and of tape slippage and misdirection of travel in the cartridge.

It is a major object of the invention to obviate the above difficulties through the provision of a tape cartridge of unusually advantageous construction and mode of operation. The environment of the invention comprises a magnetic tape cartridge assembly having a case with end zones or openings exposing tape to contact with a playback unit tape drive wheel and transducer head, a tape reel mounted to rotate within the case, and an endless tape carried in the case and including a roll mounted on the reel to rotate therewith. The tape includes a loop, and guides are provided to guide loop travel past the mentioned end zones.

As will appear, an important aspect of the invention concerns the provision of holders releasably restraining the reel against rotation and the tape against travel in the case, when the cartridge is not in use, thereby obviating the problem of tape bunching and binding. Also provided is actuator structure operable in response to operative connection of the assembly to a playback unit to displace and thereby release the holders from restraining the reel and tape, so as to allow endless travel of the tape as effected by the drive wheel. Typically, the holders may include a first holder gripping the reel, a second holder gripping the tape roll on the reel, and a third holder gripping the tape loop. The holders typically incorporate arms with the roll and reel holder arms being resiliently deflectable in release directions in response to displacement of the actuator structure by an element of the playback unit. Further, the roll holder arm may, for example, be made adjustable to different size tape rolls on the reel.

The cost of cartridge manufacture is substantially reduced inasmuch as the unit includes substantially fewer assembled parts than the typical ten to fourteen parts of prior units. For example, in one preferred embodiment of the invention, only five parts make up the complete assembly, the latter not only having tape storing and driving functions as in the past, but also providing a number of additional important advantages as described herein. These five parts include the case receptacle providing integral pressure pads as will be described, the case cover, a single part reel including a reversely tapered hub and hub flange, a single part cannister, and a pinch wheel. The holders mentioned above and many other advantageous features are incorporated in these five parts.

Additional features and advantages include provision for easy slide-snap-lock assembly of the case cover and receptacle affording loading, assembly and servicing advantages without concomitant disadvantages of encouraging inquisitive investigation and tampering; provision for case warpage control through strategically located tongue and groove connections between the case cover and receptacle; provision of re-entrant case corner recesses at one end of the case allowing easy finger gripping for selective insertion and removal of a cartridge from a stack; provision for enhanced control and guiding of tape movement within the case, to obviate problems of tape bunching and binding; and provision for other important features of construction as will appear.

These and other objects and advantages of the invention, as well as the details of illustrative embodiments, will be more fully understood from the following detailed description of the drawings, in which.

GENERAL ARRANGEMENT

Figures 2, 3, 4:
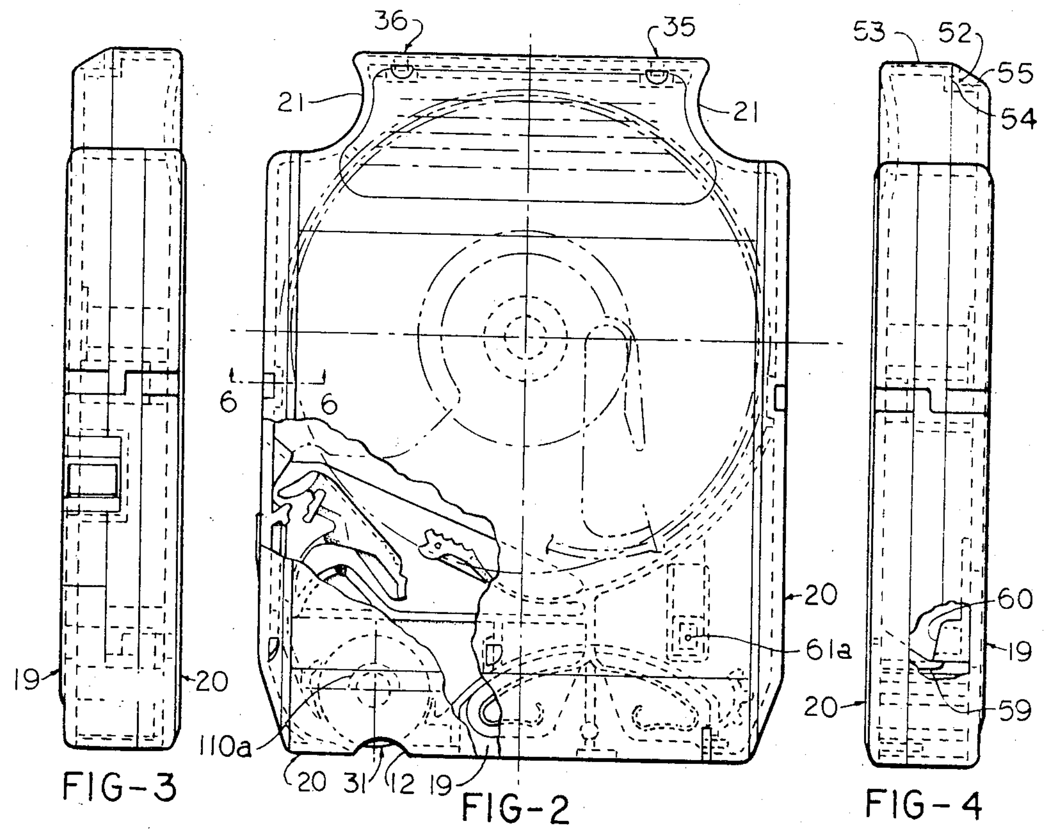
FIG. 2 is a topside plan view on one preferred cartridge embodying the invention.
FIGS. 3, 4 and 5 are opposite side and end views of the FIG. 2 cartridge.

Referring to FIGS. 1–8, the tape cartridge 10 includes a case 11 with openings or zones 12 and 13 at one end thereof for exposing a magnetic tape loop 14 to contact with a playback unit tape drive wheel 15 and transducer head 16. Another open zone or opening 17 exposes the tape loop to contact with a playback unit automatic track switch 18.

Figure 24:
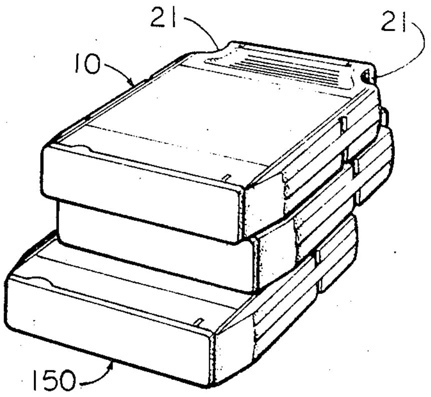
FIGS. 23 and 24 are perspective views showing stocking of the cartridges.
Figure 23:
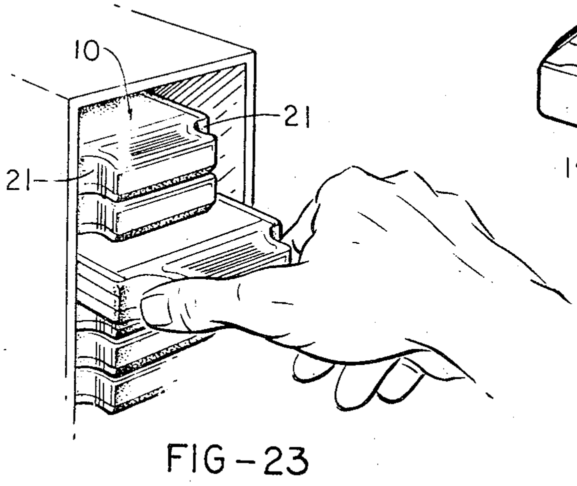
Figure 30:
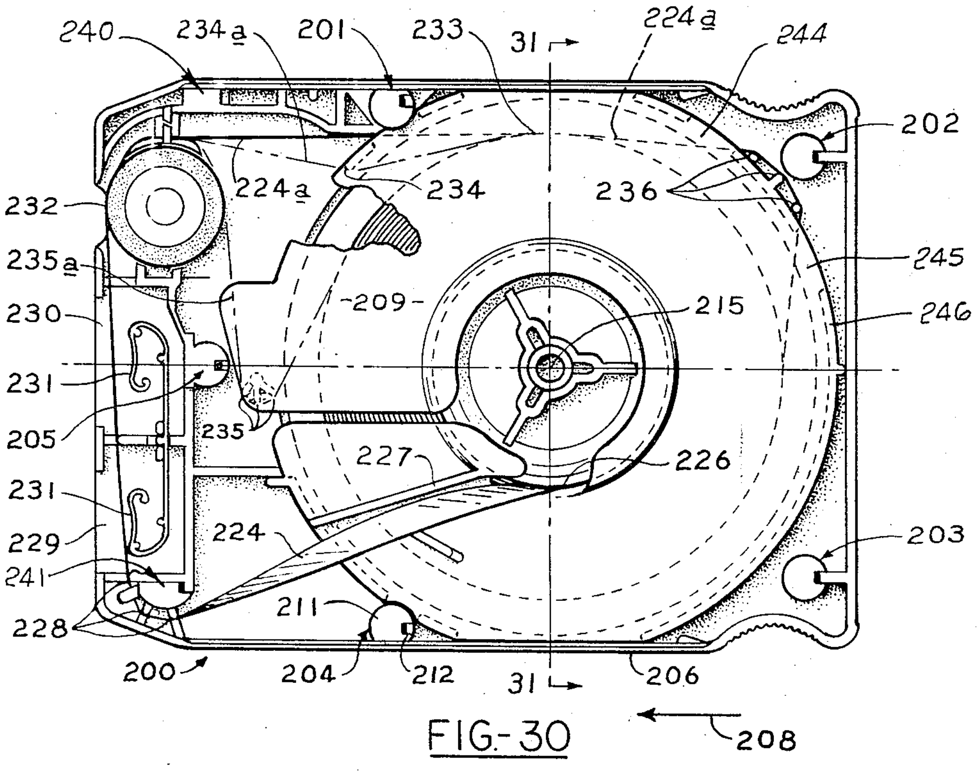
FIG. 30 is a top plan view of a modified receptacle and contents.
Figure 31:
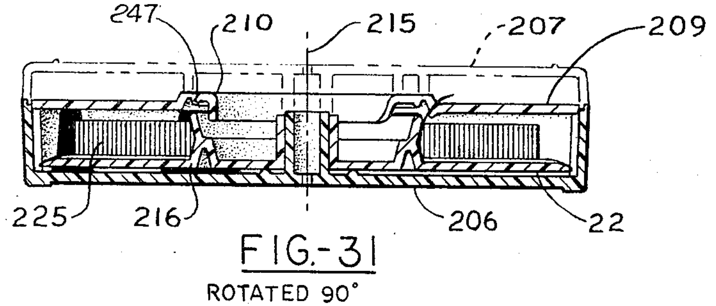
FIG. 31 is a section taken on line 31—31 FIG. 30.

The case 11 itself is generally flat and rectangular, and includes a shallow receptacle 19 and cover 20 therefor, each typically consisting of a one-piece plastic injection molding. Referring to FIGS. 23 and 24, the case defines two outwardly opening corner recesses 21 at the end of the case opposite the openings 12, 13 and 17, providing for easy thumb and finger gripping as indicated. As a result, the cartridges may be easily stacked as seen in FIG. 23 and selectively withdrawn from stacked relation.

Figure 1:
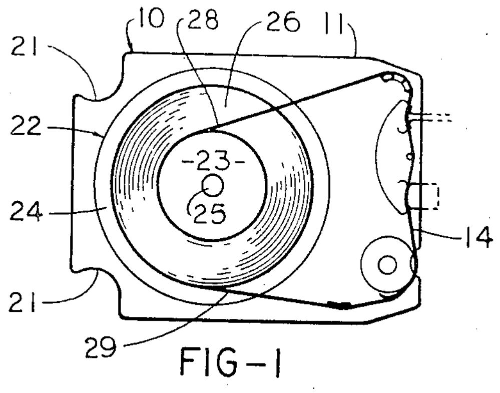
FIG. 1 is a schematic plan view of a tape cartridge showing general arrangement.

To briefly complete the general organization, a tape reel 22 including a hub 23 and a flange 24 is carried within the case to rotate on a center-post 25 as seen in FIG. 1. An endless magnetic tape is also carried in the case and includes a roll 26 mounted on the reel to rotate therewith and the loop 14 normally feeding off the roll at 28 adjacent the hub 23 and back onto the roll at 29. Retention or confinement of the tape in place on the reel is provided by a cannister 30 better seen in FIGS. 12–14 and 17. The cannister is mounted on the reel 22 as will be explained in detail, and is confined within the case. Also as will appear, the overall construction is such that a minimum of separate parts is required, and in a preferred embodiment of the cartridge only five parts comprise the assembly, as contrasted with 10 to 14 parts in present commercial units. At the same time, these five parts provide important functions in addition to those afforded by prior units. The five parts include the receptacle 19, cover 20, reel 22, cannister 30 and a tape pinch wheel 31.

RECEPTACLE AND COVER INTERCONNECTION

Figure 6:
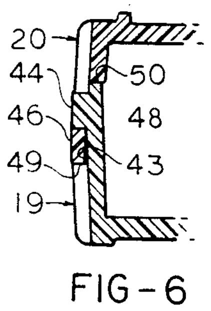
FIG. 6 is an enlarged section taken on lines 6—6 of FIG. 2.
Figure 5:
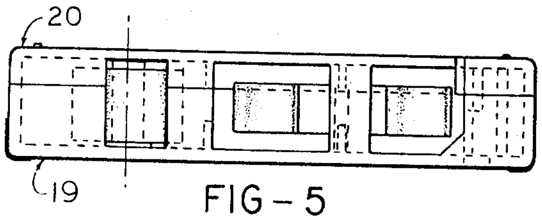
Figure 20:
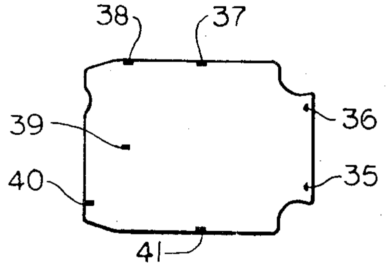
FIG. 20 is a plan view showing multiple locations of interlock between the case cover and receptacle.
Figure 21:
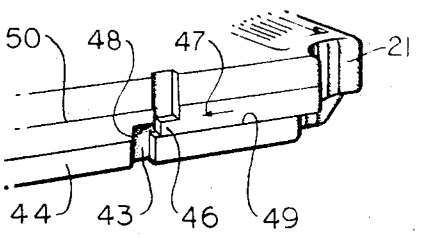
FIG. 21 is a fragmentary perspective view showing case cover and receptacle interlock at one location.

Referring now to FIG. 20, the numbers 35–41 indicate the location of multiple interconnections between the receptacle 19 and cover 20 characterized as providing for relative sliding of the receptacle and cover into assembled position wherein the cover cannot be pulled directly away from the receptacle. Certain of these connections are defined by tongue and groove elements projecting directionally generally parallel to the planes of the cover and of the cannister plate 42. For example, FIGS. 17 and 21 indicate a recess 43 sunk into the exterior side of the receptacle side wall 44 and a tongue 45 at the inner side of that wall. The cover has a tongue 46 that moves horizontally with the cover in the direction of arrow 47 in FIG. 21 and into the groove 43, wherein it is confined by receptacle shoulder 48 against vertical movement that would otherwise separate the cover from the receptacle. The cover and receptacle rims interengage and are relatively slidable along parallel horizontal planes 49 an 50 which are vertically separated, as also seen in FIG. 6. Such connections are found at points 37 and 41 in FIG. 20.

Figure 7:
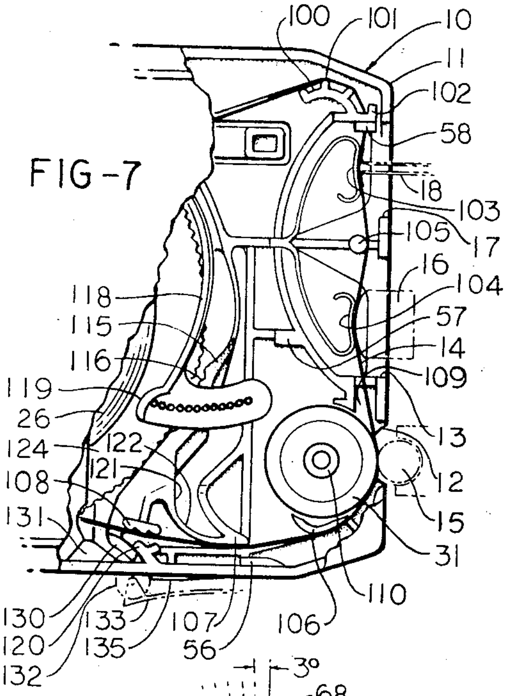
FIG. 7 is a fragmentary plan view of the FIG. 2 cartridge, broken away in part, and illustrating reception by a playback unit.
Figure 17:
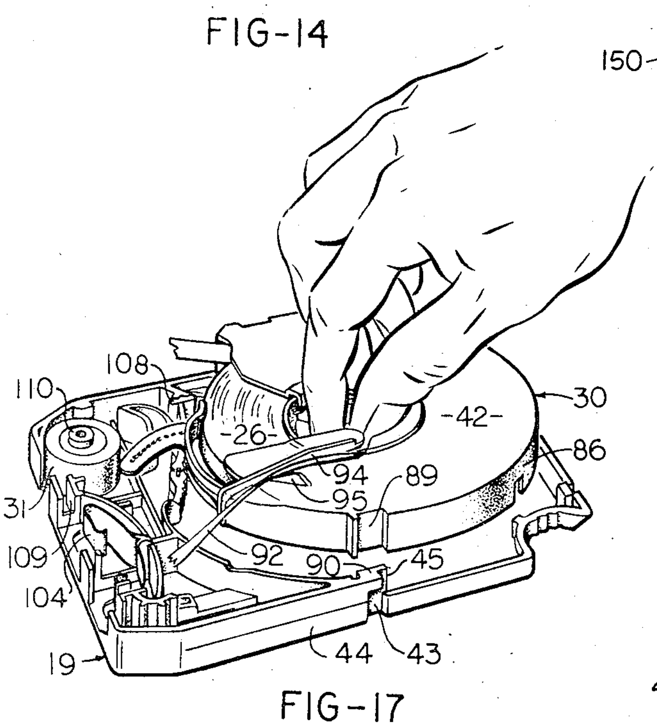
FIG. 17 is a perspective view illustrating loading into the cartridge case of tape mounted on the tape reel and confined thereon by the cannister.

FIGS. 2, 4 and 17 show details of the connections at points 35 and 36 in FIG. 20. Note the tongues 52 on the cover end wall 53 which fit in the grooves 54 cut in the receptacle end wall 55. Structure 56, 57 and 58 in FIG. 7 is undercut to provide grooves to receive tongues on the cover, forming connections at points 38–40 in FIG. 20.

Figure 8:
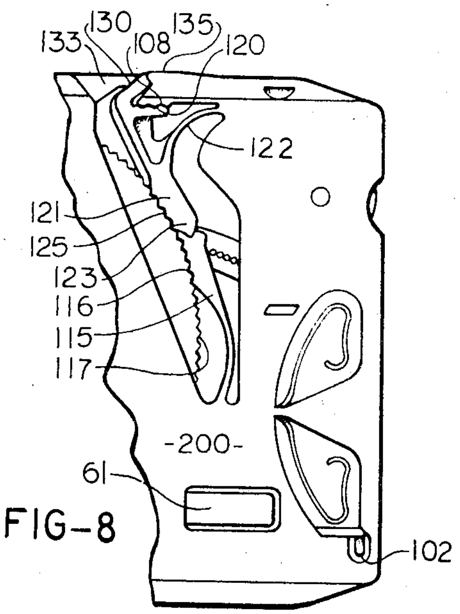
FIG. 8 is a fragmentary bottom side plan view of the FIG. 2 cartridge.
Figure 22:
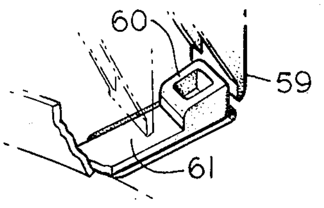
FIG. 22 is an enlarged fragmentary perspective showing case cover and receptacle interlock at another location.

The interconnection of cover and receptacle elements also includes a deflectable catch on one element and a shoulder on the other element for snap locking engagement with the catch. For example, when the cover is assembled in the direction of arrow 47 in FIG. 21, a deflectable catch 59 depending from the cover interiorly of the case rides up over ramp shoulder 60 to snap into the locked position seen in the cut-away portion of FIG. 4. See also FIG. 22. In that position the ramp blocks retraction of the cover; however, the ramp is on a spring cantilever arm 61 integral with the receptacle, as seen in FIG. 8, so as to be downwardly deflectable away from the cover to release the catch. Such downward deflection of the ramp shoulder can be effected by insertion of a pin through hole 61*a* in the cover, as seen in FIG. 2. When the outer surface of the cover is covered by a label, hole 61*a* is concealed to prevent unwarranted access to and tampering with the case interior. On the other hand, a dealer with prior knowledge of this mode of access to the case interior can, of course, gain such access for tape replacement or other purposes if desired. A label also covers the receptacle face 200 seen in FIG. 8, to conceal arm 61. Finally, the described interconnection and locking generally evenly distribute the loading and minimize problems of plastic case warpage and breakage, which could otherwise occur upon severe temperature change of frictionally held together plastic parts.

TAPE REEL

Figure 9:
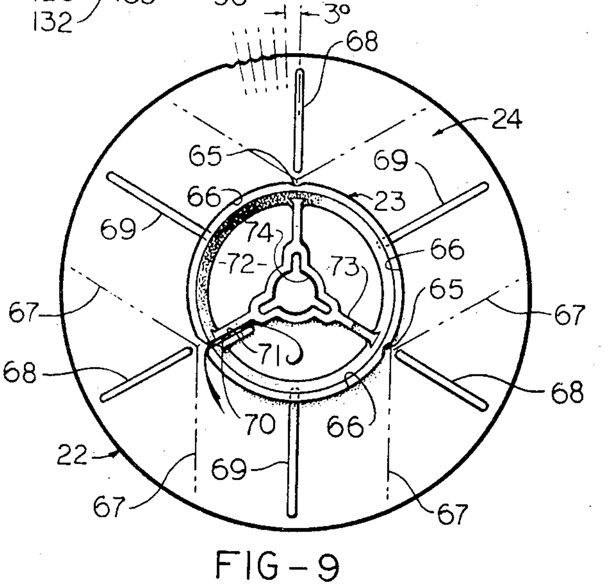
FIGS. 9 and 10 are plan and elevational views of the tape reel incorporated in the FIG. 2 cartridge.
Figure 10:
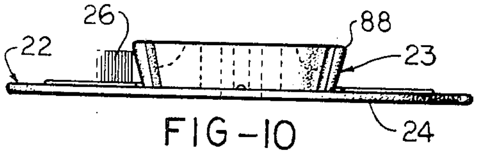
Figure 11:
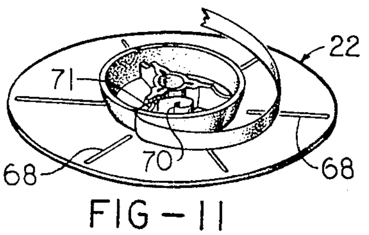
FIG. 11 is a perspective view of the reel seen in FIGS. 9 and 10.

Referring to FIGS. 9 – 11, the reel 22 may advantageously comprise a one-piece plastic injection molding, including a thin flange 24 carried by a frustoconical hub 23 tapering toward the plane of the flange for preventing binding of the tape on the hub. Such one-piece construction is enabled by provision of at least three peripheral seam grooves 65, extending in slant height directions along the hub exterior. These grooves are sunk in the hub surface to be spanned by the tape supported on the flange, and the grooves are typically produced by tooling inserts. Thus, for the three groove example seen in FIG. 9, three mold inserts have hub forming faces at 66 and corners that meet to form recessed seam lines at the grooves, and the inserts are retractable radially away from the hub following injection molding of the latter. The mold insert edges are indicated by broken lines 67.

The flange 24 has radial ribs 68 spaced outwardly from the seam grooves 66, and other longer radial ribs 69, all supporting the tape roll 26 to support the tape with minimum frictional resistance. Upon initial assembly of tape on the reel, the tape end tab 70 is placed in a retention slot 71, as seen in FIGS. 9 and 11, and the tape is wound on the reel about the hub. Thereafter, the tab 70 is removed from the slot 71 and connected to the opposite end of the tape to form the loop 14 as seen in FIG. 1. Finally, the reel mounted tape is adapted to be assembled into the receptacle, as for example in the manner seen in FIG. 17. For that purpose, three finger grip compartments 72 are formed in the hollow hub by molded radial webs 73, and the central bore 74 of the hub is fitted over the mounting post 25 in the receptacle.

Figures 15, 16:
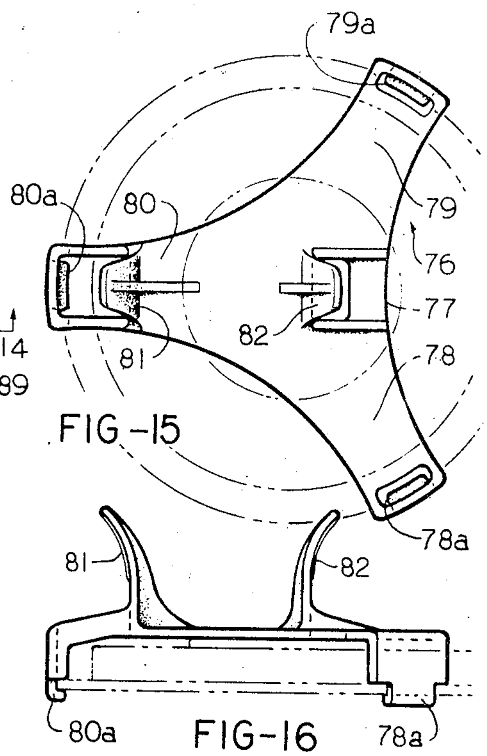
FIGS. 15 and 16 are plan and side elevational views of a tape reel holder.
Figure 13:
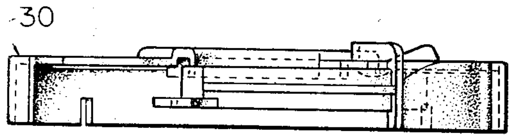
FIG. 13 is an elevational view of the cannister of FIG. 12.
Figure 14:
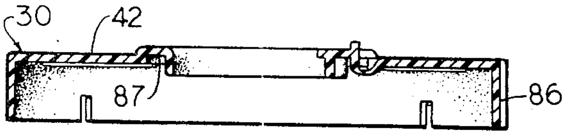
FIG. 14 is a section taken on lines 14—14 of FIG. 12.

The reel mounted tape may be handled in production by use of tape reel holders. As seen in FIGS. 15 and 16, the holder 76 includes a spider 77 having legs 78–80, and two finger grips 81 and 82 projecting above the spider. The legs have depending reel grips **78*a*, 79*a* and 80*a* channeled to grip the edge of the reel flange as indicated in broken lines in FIG. 16. Squeezing of the finger grips 81 and 82** affords release of the reel flange.

TAPE FEED CONTROL

Referring now to FIG. 17, the reel and tape assembly is adapted to be loaded into the receptacle after the tape retaining cannister 30 is assembled onto the reel. The cannister includes an annular plate 42, and a skirt 86 depending therefrom to extend about the tape roll in spaced relation thereto. Plate 42 has radial ribbing at its inner side to retain the tape roll with minimum friction. The plate 42 includes a channeled portion 87 extending circularly incompletely to loosely interfit the rim 88 of the reel hub allowing free rotation of the hub within the cannister. In this regard, the cannister is restrained against rotation by vertical reception in the skirt recesses 89 of receptacle tongues 90, as seen in FIG. 17.

Figure 12:
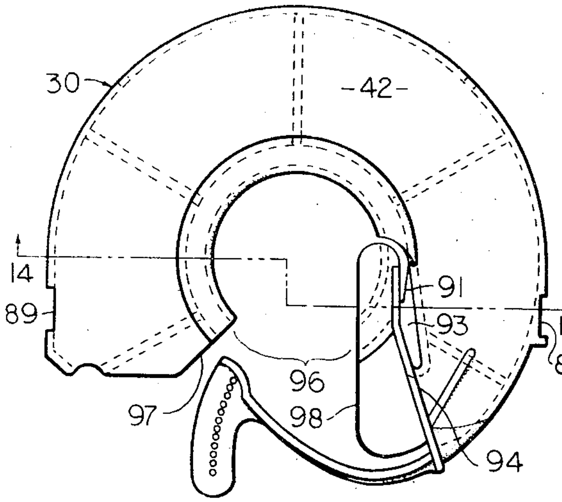
FIG. 12 is a plan view of the tape cannister in the FIG. 2 cartridge.

The cannister plate 42 also has a through opening 91 proximate the inner boundary of the roll to pass tape feeding off the roll as seen at 92 in FIG. 17. In this regard the plate has downward grooving at 93, as seen in FIG. 12, and which inclines downwardly toward the locus of tape spooling off the roll at its inner boundary, for guiding outward travel onto the outer and upper surface of the plate. The plate also has protruding fences or shoulders 94 and 95 located to guide tape loop travel laterally across the cannister upper surfaces, during which time the tape deflects or twists to lay almost flatly with respect to the top surface of the plate. Fence 94 is elongated at one side of the tape to prevent displacement thereof toward the cut-away area 96 between edges 97 nad 98 of the cannister. Fence 95 extends toward the fence 94 and tapers downwardly to lift the tape clear of the plate upper surface for minimum drag of the twisted tape. Thus tape loop travel and twisting are well controlled.

Referring to FIG. 7, it will be seen that the tape untwists as it nears the guide 100, around which the tape is turned while contacting only the spaced touch points or ribs 101. As the tape leaves the guide it passes through a recess in structure 102 acting to retain the tape at proper level for subsequent passage adjacent elements 18 and 16. Structure 102 and guide 100 are molded integrally with the receptacle. Also molded integrally with the receptacle are the pressure pad arms 103 and 104 which are resiliently deflectable to have concave terminals to lightly but firmly urge the tape against the automatic track switch 18 and the magnetic head 16, these being carried by the playback unit. Switch 18 functions to initiate displacement of the head 17 transversely of the tape to read a different track, in response to detection of a sync signal on the tape. A rib 105 deflects the tape slightly between the elements 16 and 18 so as better to follow the path configurations indicated in FIG. 7.

The tape then passes through a channel 109, between the pinch and drive rollers 31 and 15, and around the guide 106 turning the tape back toward the cannister and the periphery of the roll 26 for winding thereon. Another guide is indicated at 107 for directing tape travel adjacent a tape holder 108 to be described. A post 110 integral with the receptacle mounts the pinch roller. A suitable abutment shoulder **110*a* on the cover as seen in FIG. 2 acts as a lateral support for the post, and also retains the pinch wheel axially of the post 110.**

TAPE AND REEL RESTRAINT

As previously mentioned, an important aspect of the invention has to do with the provision of holders releasably restraining the reel against rotation and the tape against travel in the case, and also actuator structure operable in response to operative connection of the assembly to a playback unit to displace and thereby release said holders from so restraining the reel and the tape, allowing endless travel of the tape as effected by the drive wheel.

In the example illustrated in FIGS. 2, 7, 8, 17 and 18, a first resiliently deflectable holder arm 115 integrally molded to the receptacle has a serrated terminal 116 biased by the arm to grip the serrated periphery 117 of the reel flange; a second resiliently deflectable holder arm 118 integrally molded to the cannister has a terminal 119 biased by the arm to grip the periphery of the tape roll 26 on the reel; and a third holder 108 as previously mentioned grips the tape by pressing it against a backer 120. The latter holder is carried by the actuator arm 121 integrally molded to the receptacle via web 122. The actuator has a terminal 123 seen in FIG. 18 as having V-shaped tongue and groove interfit connection with the holder arm 115, and biasing of the latter serves therefore to bias the actuator toward the serrated periphery of the reel flange. At the same time, the holder 108 is biased to grip the tape, as previously mentioned. Note also that the actuator has a serrated face 125 engaging the reel serrations 117, as best seen in FIG. 8.

Figure 18:
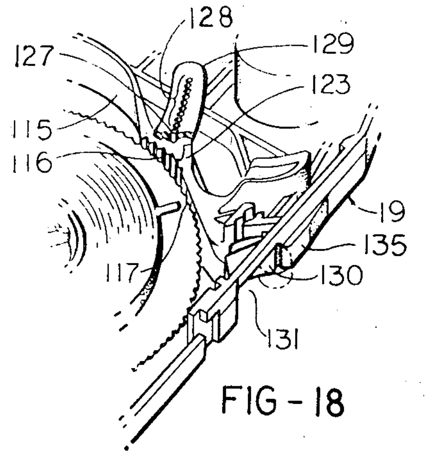
FIG. 18 is fragmentary perspective view showing unlocking position of the tape and tape roll holders.
Figure 19:
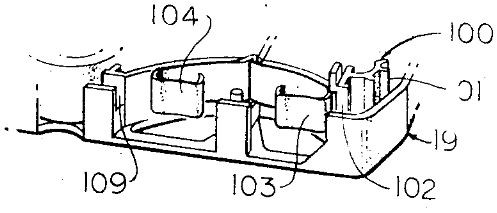
FIG. 19 is a fragmentary perspective view showing integrally molded tape pressure pads presented toward the transducer head locus.

FIGS. 7 and 18 show the first and second holder arms 115 and 118 as having adjustable interconnection, as by pin 127 on arm 115 fitting selectively in openings 128 on tab 129 of arm 118. Such connection facilitates accommodation of arm 118 to larger or smaller tape rolls 26, as respects holding force exertion, while at the same time the holder arm 118 is made deflectible with arm 115.

As previously mentioned, and as is clear from FIG. 7, the holder arms 115 and 118 are resiliently deflectable in response to displacement of the actuator structure in a holder releasing direction at which time the arms have operative interconnection. In this regard, the actuator includes a molded pressure pad 130 locally exposed at the case periphery, the case proximate that pad being locally recessed at 131 to receive a playback unit roller 132 that is flat spring mounted at 133 an urged toward and into forceful engagement with the pressure pad. The latter deflects inwardly as seen in FIG. 7, to displace the actuator and all holders out of gripping engagement with the tape roll, reel and loop, unblocking the latter for displacement of the tape by the drive roller 15 during playback. Thus, whereas the tape, roll and loop are firmly held by the holders to resist their inadvertent displacement when the cartridge is not inserted in a playback unit, such insertion automatically results in freeing of these elements for playback. Further, unless both the tape and reel are held against displacement, there is great risk of inadvertent vibration or acceleration of the cartridge inducing tape bunching and binding in the cartridge leading to malfunction and the expense of repair.

Upon insertion of the tape cartridge into a playback unit, the roller 132 rides over a boss 135 at the side of the case, before dropping into recess to deflect pad 130. The shaping of the boss in relation to the recess enhances the tension in spring 133 that snaps the roller into the recess and against the pad 130 to secure its deflection.

Figure 29:
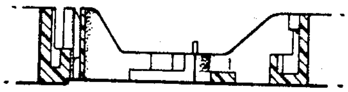
FIG. 29 is a section taken on line 29—29 of FIG. 28.
Figure 28:
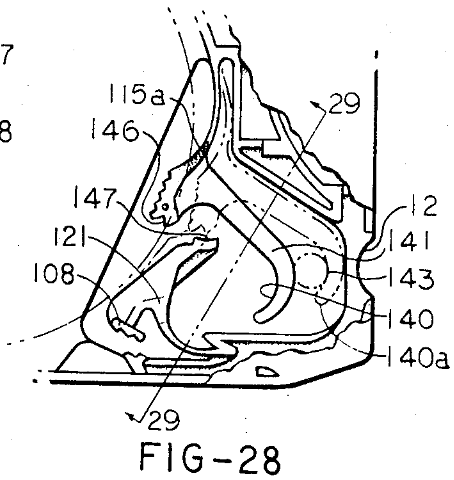
FIG. 28 is a fragmentary plan view showing a modified actuator for the tape and roll holders.

Referring to FIGS. 28 and 29, an alternative form of actuator comprises a hook 140 on a finger 141 molded integrally with arm 115*a* (corresponding to arm 115 described above). Useful in 4-track (instead of 8-track) tape environment, the insertion of the cartridge into the playback unit effects entry of a pinch wheel shaft into the receptacle and into position 143 indicated in broken lines in FIG. 28. Shaft 143 thereby engages hook 140 and deflects it to broken line position 140*a*. Accordingly, holder 115*a* is drawn away from the reel periphery, simultaneously retracting the roll holder 119 away from the roll as seen in FIG. 7. Also, the terminal 146 of arm 115*a* engages the terminal 147 of arm 121, and deflects same thereby to retract holder 108 away from the tape loop.

OTHER FEATURES

Figures 25, 26:
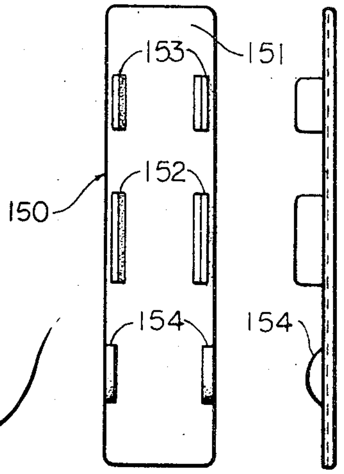
FIGS. 25 – 27 are plan, elevation and end views of a dust guard for the cartridge.
Figure 27:

Referring to FIGS. 25 – 27, a plastic dust guard is indicated at 150 in the form of a thin plate 151 sized to cover the end of the case as seen in FIG. 24. The guard also includes pairs of tangs 152 and 153 sized to enter the case openings 13 and 17, straddling the tape and interfering with the cover and receptacle sufficiently to retain the dust cover in position. Ears 154 fit in recesses 12 in the cover and receptacle for ease of grasping and removing the dust cover.

MODIFIED FORM

In the modified tape cartridge 200 seen in FIGS. 30—33, the numbers 201–205, 240 and 241 indicate the locations of multiple interconnections between the receptacle 206 and cover 207, characterized again as providing for relative sliding of the receptacle and cover (in the direction of arrow 208) into assembled condition, wherein the cover cannot be pulled or lifted directly away from the receptacle. Such interconnections are defined by tongue and groove elements (which may be similar to that describd above) projecting generally parallel to the planes of the cover and plate 209 of cannister 210. Thus, for example post 211 carried by the receptacle may define grooves 212 for reception of tongues (not shown) integral with the cover.

Also provided in this embodiment is means for releasably attaching together the thus assembled receptacle and cover elements. Such means includes registrable tubular bosses 213 and 214 integral with the receptacle and cover, respectively. As is clear from FIG. 31, the bosses, when registered, are axially aligned with the axis 215 of the tape reel 216 and the cannister 210.

Figure 32:
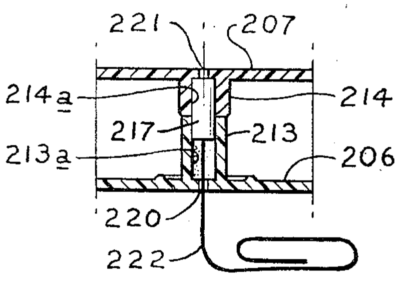
FIGS. 32 and 33 are fragmentary sections showing modified interlocking means.
Figure 33:
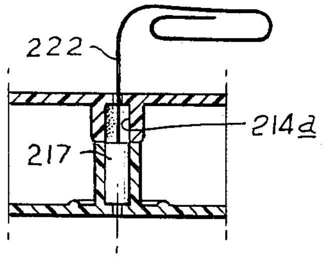

Also provided is a part, such as pin 217, which is shiftable axially within the tubular bosses into and out of internal bridging relation therewith. Typically, the pin 217 may have a push-fit with the bores 213*a* and 214*a* of the bosses. In this regard, the pin may be provided with longitudinal external flutes to better accommodate the frictional or push-fit. In down position as seen in FIG. 33, the cover and receptacle are not locked against relative sliding to disassemble the tongue and groove interconnections; whereas, in up-position as seen in FIG. 32, the pin bridges the bosses to lock the cover and receptacle against such disassembly. Small openings 220 and 221 in the receptacle and cover accommodate insertion of a tool such as a paper clip wire 222 to move the pin back and forth, as described.

Referring again to FIG. 30, and tracing the path of travel of the tape 224, it spools off the rolls 225 at 226, elevates through slot 227 in the cannister plate 209, and is guided by fence or barrier 227 toward touch points 228. It is turned by the latter to travel past the cartridge front openings 229 and 230 and frontwardly of the pressure pad cantilever arms 231. The tape thus travel around idler roller 232 and inwardly at 224*a* to rejoin the tape roll at 233. Alternatively, the tape may be caused to travel in a deviated path to turn about lip 234 or touch points 235, as indicated by broken lines of tape travel 234*a* and 235*a*, the tape then rejoining the roll periphery as indicated. Further, the tape having paths 224*a* may be passed about touch point guides 236 before rejoining the roll at the side thereof opposite the pressure pad, these alternative modes being available for use with different tape roll diameters, and different surface quality tapes, as may be required by the packager. Note window openings 244 and 245 in the cannister skirt 246 to pass the tape to and from guides 236.

Cannister plate annular wall 209 terminates at its inner periphery with a downwardly projecting shoulder structure 247 depending to a level below the upper projecting shoulder boss of the hub, thus blocking the tape from slipping over the hub into the hollow interior thereof.

I claim:

1. In a magnetic tape cartridge assembly having a case with end zones for exposing tape to contact with a playback unit tape drive rotor and transducer head, a tape reel mounted to rotate within the case, an endless tape carried in the case and including a roll mounted on the reel to rotate therewith, the tape having a loop, and guides to guide the tape to travel past said zones, the improvement comprising a. the case including and being defined by molded plastic receptacle and cover elements which are longitudinally elongated, and b. means for releasably attaching the receptacle and cover elements together, said means including a deflectable catch carried by one of the cover and receptacle elements and a shoulder carried by the other of the elements for snap locking engagement with the catch, said catch and shoulder located between said reel and one of said end zones, and
c. said cover and receptacle elements having multiple tongue and groove interconnections for distributing interconnection loading, said tongues and grooves projecting directionally generally longitudinally and parallel to the plane of said cover and receptacle elements to guide relative longitudinal slide assembly of said elements following their interengagement in order to bring said shoulder and catch into snap locking engagement, said tongue and groove interconnections having means for providing full interfit only after completion of said relative longitudinal slide assembly of said elements and the connections then retaining the elements against pull apart separation in any direction, generally normal to the case,
d. holder means to restrain at least one of the reel, tape roll and tape loop against travel in the case, and
e. actuator structure responsive to operative insertion of the assembly to a playback unit to displace and thereby release the holder means from so retraining said one of the reel, tape roll and the loop, said actuator structure including a pressure pad locally exposed at the case periphery, the case proximate to the pad being recessed to receive a playback unit roller that is spring urged toward and into engagement with the pad.

2. In a magnetic tape cartridge assembly having a case with end zones for exposing tape to contact with a playback unit tape drive wheel and transducer head and a side wall having a recess adapted to receive a playback unit roller, a tape reel mounted to rotate within the case, and an endless tape carried in the case and including a roll mounted on the reel to rotate therewith, the tape having loop, and guides including a pinch wheel to guide tape loop to travel past said zones, the tape loop having a return portion extending from said pinch wheel to the periphery of the tape roll, the improvement comprising
a. holder means releasably restraining at least one of the reel, tape roll and the tape loop against travel in the case, and
b. actuator structure including a pad locally exposed to said recess radially outwardly of the reel for inward deflection in response to operative connection of the assembly to a playback unit to displace and thereby release said holder means from so restraining said at least one of said reel, tape roll and the tape, allowing endless travel of the tape as effected by said drive wheel, said tape return portion extending intermediate said pad and the tape roll, said pad also located closer to said reel than to said roller.

3. In a magnetic tape cartridge assembly having a case with end zones for exposing tape to contact with a playback unit tape drive wheel and transducer head and a side wall having a recessed wall portion adapted to receive a playback unit roller, a tape reel mounted to rotate within the case, and an endless tape carried in the case and including a roll mounted on the reel to rotate therewith, the tape having a loop, and guides to guide tape loop to travel past said zones, the improvement comprising
a. holders releasably restraining the reel against rotation and the tape against travel in the case, and
b. actuator structure including a pad locally exposed proximate to said recessed side wall portion of the case radially outwardly of the reel for inward deflection in response to operative connection of the assembly to a playback unit to displace and thereby release said holders from so restraining the reel and the tape, allowing endless travel of the tape as effected by said drive wheel, said holders including a first holder arm gripping the reel, a second holder arm gripping the tape roll, said arms connected with the actuator structure to be deflectable in response to displacement of said actuator structure in a holder releasing direction.

4. The assembly of claim 3, wherein said holders include a third holder carried by the actuator structure to grip and release the tape loop.

5. The assembly of claim 3 including means adjustably interconnecting the first and second holder arms, and at least one of said arms being engageable by said actuator structure.

6. The assembly of claim 1 including a tape cannister having a plate located in said case to retain the tape roll on the reel at the underside of the plate, the cannister plate having a through opening proximate the inner boundary of said roll to pass tape feeding off the roll at said inner boundary, the plate having grooving inclined toward said inner boundary proximate said opening to guide tape outward travel onto the upper surface of the plate, and the plate having fencing to guide tape loop travel laterally across the cannister upper surface.

7. In a magnetic tape cartridge assembly having a case with end zones for exposing tape to contact with a playback unit tape drive rotor and transducer head, a tape reel having a central bearing mounted to rotate on a post within the case with a tape roll thereon and a hub radially outward of said bearing, and guides to guide the tape to travel past said zones, the improvement comprising a cannister having a plate located in said case to retain the tape roll on the reel at the underside of the plate, the case including and being defined by molded plastic receptacle and cover elements, said cannister and case having thereon interfitting shoulders at the periphery of the cannister to restrain the cannister against rotation with the reel, the cannister radially having annular shoulder structure interfitting reel annular shoulder structure in radially outwardly spaced relation from the reel hub, that are relatively rotatable to accommodate removable mounting of the cannister to extend over the reel, said shoulder structures defined by a boss projecting upwardly away from a reel flange and by a cannister annular portion annularly recessed toward and to receive a portion of said boss, the cannister plate defining a central through opening radially inward of said annular portion, and finger grip means carried by the reel to be centrally and accessibly exposed through the opening in the cannister top for use in accurately positioning the reel and mounted cannister in the case with the cannister top spaced a predetermined distance above the reel flange which is greater than the tape width, and means to attach together the receptacle and cover elements.

8. The assembly of claim 7, in which one of said guides is located proximate a corner of said case but enclosed therein, said guide being integral with the case and having ribs defining touch points for tape engagement, the cannister having fencing to guide tape travel toward said ribs.

9. The assembly of claim 7, in which said reel comprises a one-piece plastic molding and includes said hub and said flange of larger diameter than the hub, the hub being frusto-conical to taper toward the plane of the flange and having at least three peripheral seam grooves at circularly spaced locations to be spanned by the tape, the flange having ribbing to support the tape roll at one side thereof.

10. The assembly of claim 9, in which said hub is slotted to initially receive and retain a tape tab during winding of tape on the reel.

11. The assembly of claim 1 in which the case side is recessed to receive a playback unit roller that is spring urged toward the recess, the case periphery adjacent the recess being outwardly protuberant in the path of said roller travel toward the recess.

12. The assembly of claim 1, in which said other element defines a small through opening to receive a tool for deflecting the catch to release said shoulder.

13. The assembly of claim 1, in which the case is generally flat and rectangular, said interconnections located proximate corners of said case and at the elongated periphery thereof.

14. The assembly of claim 2, including a deflectable catch carried by one of the cover and receptacle elements and a shoulder carried by the other of the elements for snap locking engagement with the catch, said other element defining a small through opening to receive a tool for deflecting the catch to release said shoulder.

15. The assembly of claim 1, in which the case is generally flat and rectangular, the case defining outwardly opening corner recesses at one end thereof for finger gripping.

16. The assembly of claim 7 including at least one plastic pressure arm integral with said receptacle and projecting for engagement with the tape at one of said end zones.

17. The assembly of claim 1 including molded plastic pressure pad means integral with the case and located to resiliently bias the tape proximate one of the case end zones.

18. In a magnetic tape cartridge assembly having a case with end zones for exposing tape to contact with a playback unit tape drive rotor and transducer head, a tape reel mounted to rotate axially within the case and guides to guide the tape to travel past said zones, the improvement comprising:

a. the case including and being defined by molded plastic receptacle and cover elements, said elements having multiple tongue and groove interconnections for distributing interconnection loading, said tongues and grooves projecting generally parallel to the plane of said elements to guide assembly of said elements following their interengagement, and b. means for releasably attaching together the assembled elements, said means including registrable tubular bosses on the elements proximate the axis of said reel, and a part shiftable axially within said bosses and into and out of internal bridging relation thereiwth, said part comprising a pin having a push fit with the bores defined by the bosses.

19. The improvement of claim 18 wherein the receptacle and cover elements define openings in alignment with said pin but smaller than said bores to receive a pin for shifting the tool into and out of said bridging relation.

* * * * *